(12) United States Patent
Haida et al.

(10) Patent No.: US 8,292,369 B2
(45) Date of Patent: Oct. 23, 2012

(54) ADJUSTING DEVICE FOR A MOTOR VEHICLE AND METHOD FOR ASSEMBLING AN ADJUSTING DEVICE

(75) Inventors: Stefan Haida, Remscheid (DE);
Andreas Dannheisig, Versmold (DE);
Bernd Engels, Remscheid (DE)

(73) Assignee: Johnson Controls GmbH, Burscheid (DE)

( * ) Notice: Subject to any disclaimer, the term of this patent is extended or adjusted under 35 U.S.C. 154(b) by 245 days.

(21) Appl. No.: 12/298,692

(22) PCT Filed: May 11, 2007

(86) PCT No.: PCT/EP2007/004215
§ 371 (c)(1),
(2), (4) Date: Mar. 10, 2009

(87) PCT Pub. No.: WO2007/131732
PCT Pub. Date: Nov. 22, 2007

(65) Prior Publication Data
US 2010/0013286 A1      Jan. 21, 2010

(30) Foreign Application Priority Data

May 17, 2006   (DE) .......................... 10 2006 023 363

(51) Int. Cl.
*B60N 2/02*   (2006.01)
*B23P 11/00*  (2006.01)

(52) U.S. Cl. ........................................ 297/361.1; 29/428
(58) Field of Classification Search ................ 297/361.1, 297/354.12; 29/428
See application file for complete search history.

(56) References Cited

U.S. PATENT DOCUMENTS

| | | | |
|---|---|---|---|
| 4,576,412 A | 3/1986 | Terada | |
| 5,452,938 A * | 9/1995 | Ernst | ............ 297/362 |
| 5,794,479 A | 8/1998 | Schwarzbich | |
| 5,881,854 A | 3/1999 | Rougnon-Glasson | |
| 6,032,777 A * | 3/2000 | Denis | ............ 192/223.2 |

FOREIGN PATENT DOCUMENTS

| | | | |
|---|---|---|---|
| DE | 2822379 A * | 11/1979 | |
| DE | 4120617 A1 | 12/1992 | |
| DE | 4437073 A1 | 1/1996 | |
| DE | 19620281 A1 | 11/1997 | |
| DE | 19726257 A1 | 1/1998 | |
| DE | 19527912 A1 | 8/1998 | |
| DE | 19725899 A1 | 12/1998 | |
| EP | 0631901 A1 | 1/1995 | |

* cited by examiner

*Primary Examiner* — Milton Nelson, Jr.
(74) *Attorney, Agent, or Firm* — Butzel Long

(57) ABSTRACT

An adjusting device for a vehicle seat includes a brake housing that is centered about an actuating rotational axis. The brake housing is formed in a radial direction of the actuating rotational axis and includes a housing element that is generally circular and has a outer side wall, and upper wall and an inner side wall.

16 Claims, 1 Drawing Sheet

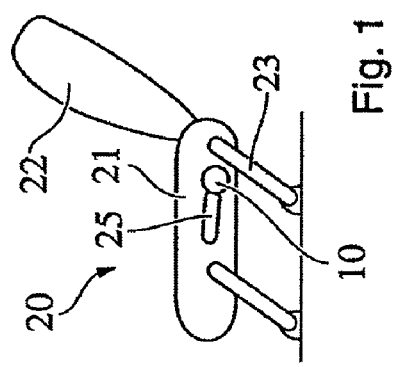
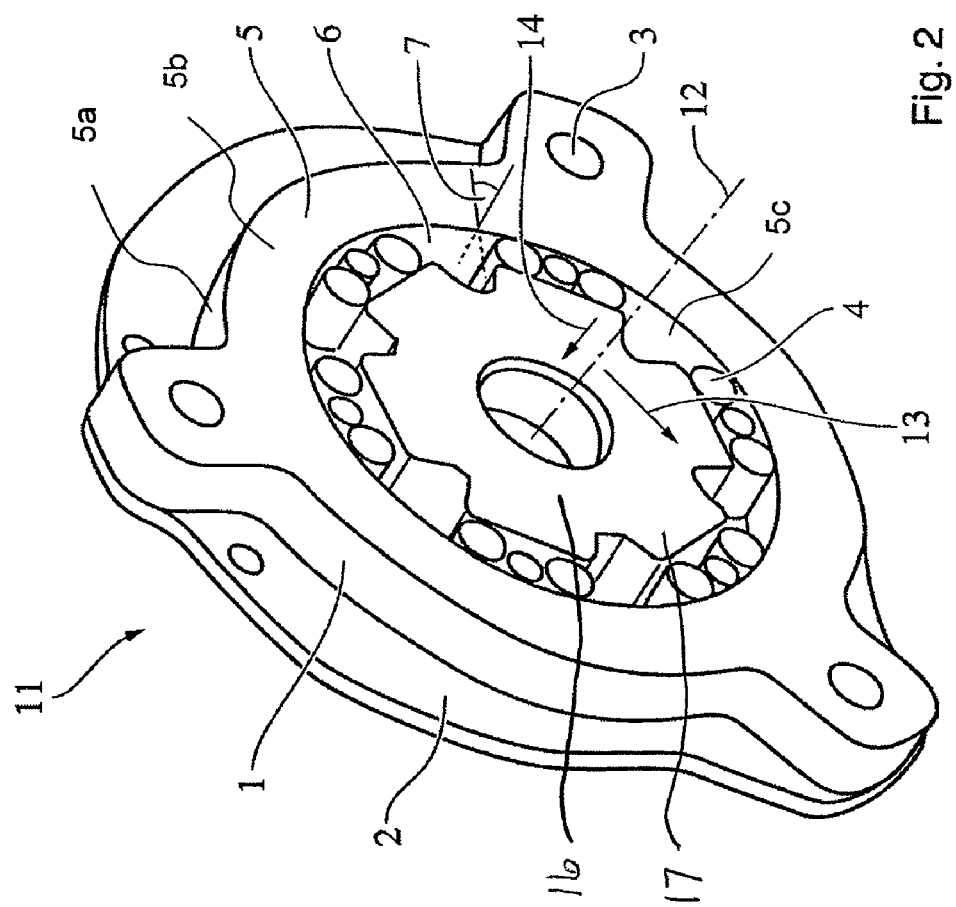

ADJUSTING DEVICE FOR A MOTOR VEHICLE AND METHOD FOR ASSEMBLING AN ADJUSTING DEVICE

CROSS REFERENCE TO RELATED APPLICATIONS

The present application is a National Stage filing of International Application No. PCT/EP2007/004215 which claims priority to German Patent Application No. DE 10 2006 023 363.3 filed May 17, 2006, the entire disclosures of which are incorporated herein by reference.

BACKGROUND

The present disclosure relates to an adjusting device for a motor vehicle, and in particular, an adjusting device for a vehicle seat.

Vehicle seats may be adjustable, and include an adjusting device for varying a position of the seat, such as manual height or inclination adjustment of a vehicle seat. The adjusting device may include an adjustment lever coupled to a locking means which may be brought into engagement with a toothed portion arranged on the periphery of a driving gear. The adjusting drive further includes a braking device which is arranged in a brake housing. While conventional braking devices work, they may be costly and bulky and may influence the corresponding dimensional accuracy of the adjusting device.

Therefore, there is a need in the art for an adjusting device that is lightweight, simple, and structurally compact.

SUMMARY

Accordingly, the present disclosure relates to an adjusting device for a motor vehicle component, in particular a vehicle seat. The adjusting device includes a brake housing centered about an actuating rotational axis. The brake housing is formed in the radial direction of the actuating rotational axis, using a housing element. The housing element is substantially circular and includes an an outer side wall, and upper wall and an inner side wall. The brake housing has a high degree of stability in the direction in which the greatest forces occur, namely in the radial direction of the actuating rotational axis. The stability is increased by increasing the plate-shaped material housing element, for a given material thickness and given internal diameter of the brake housing, so that the edge of the housing element remaining around the recess of the brake housing is larger.

The brake housing includes a flange element positioned in at least one axial direction of the actuating rotational axis. As a result, a stable brake housing that is structurally compact is provided. The interior of the brake housing and the flange element retains parts located in the brake housing against loss. The flange element and the housing element are connected to one another to form the brake housing, such as by a screw, riveting or clipping or the like. As a result, a particularly stable connection of the brake housing may be achieved.

The adjusting device includes a step-by-step mechanism, for adjusting a vehicle seat, for example for adjusting the seat height and/or seat inclination. In this example, the step-by-step mechanism is a drive gear operating coupled to the actuating element. The drive gear is centered on the rotational axis. An outer edge of the drive gear includes a plurality of teeth. The teeth operatively engage a breaking devise for adjusting the seat position.

A method for producing and/or for assembling an adjusting device is provided. In a first step, the housing element is formed from a plate-shaped material, and includes a precision stamped functional surface. In a second step, the housing element and the flange element are connected to one another, such as by a screw connection, riveting or clipping. The adjusting device protects elements located in the brake housing against loss, in particular rolling elements or the like.

Other features and advantages of the present disclosure will be readily appreciated, as the same becomes better understood in view of the subsequent description taken in conjunction with the accompanying drawings.

BRIEF DESCRIPTION OF THE DRAWINGS

FIG. 1 is a side view of a vehicle seat having an adjusting device.

FIG. 2 is a sectional view of a brake housing for the adjusting device of FIG. 1.

DESCRIPTION

Referring to FIG. 1, a vehicle 20 is illustrated. For example, the vehicle seat 20 includes a seat part 21 and a backrest part 22. A guide rod 23 is connected to the seat part 21. The seat 20 also includes an adjusting device 10 for varying a relative position of the seat part 21 with respect to the back rest part 22. For example, the inclination or height or the like may be altered. The adjusting device 10 includes an actuating element 25 for varying the relative position of the guide rods 23 with respect to the seat part 21 or backrest part 22.

Referring to FIG. 2, the adjusting device 10 includes a brake housing 11. The brake housing 11 has a housing element 1 that is generally circular. The brake housing 11 also includes a flange element 2 such as a flange plate 2 that is adjacent to the housing element 1. The adjusting device 10 includes an adjusting mechanism mechanism centered on an actuating rotational axis 12. The actuating element 25 operatively controls the adjusting device 10 by a rotational movement about the actuating rotational axis 12 or about an axis in the spatial vicinity of the rotational axis, for adjustment of the vehicle seat 20. Such an adjustment can be provided as an inclination adjuster and/or height adjuster or an inclination and height adjuster. In a radial direction shown at 13 relative to the actuating rotational axis 12, the adjusting mechanism of the adjusting device 10 includes the housing element 1. The housing element 1 absorbs in the radial direction, any braking forces, clamping forces and/or forces acting radially outwardly and is correspondingly designed with regard to its dimensions in the radial direction 13. In an axial direction shown at 14 relative to the actuating rotational axis 12, the adjusting mechanism of the adjusting device 10 includes the flange element 2. The flange element 2 is secured to the housing element 1. For example, the housing element includes at fastening locations shown at 3 three or more fastening points on a periphery of the housing element 1. In this example, the fastening points 3 are uniformly spaced about a circumference of the housing element 1. The attachment between the housing element 1 and the flange element 2 may be by a screw connection or riveting or clipping, or the like.

The housing element 1 forms a wall structure 5, such as an outer side wall 5a, and upper wall 5b and an inner side wall 5c. The inner side wall includes a functional surface 6. The adjusting mechanism further includes rolling elements 4 which cooperate with the functional surface 6 inside the housing element 1. The functional surface 6 includes an angle of inclination 7 relative to an upper wall 5b of the housing element 1. In this example the angle inclination 7 is a right angle.

In this example, the functional surface 6 is, formed using a precision stamping process. The methodology begins with a uniform sheet material used to form the housing element 1. The methodology also includes the steps of assembling the adjusting device and/or the housing element to the flange element 2, at the fastening points 3. The joined housing elements and flange element 2 to prevent the rolling elements 4 against falling out. The methodology further includes the step of assembling the flange element 2, the vehicle seat 20.

The present disclosure has been described in an illustrative manner. It is to be understood that the terminology used is intended to be in the nature of words of description, rather than of limitation.

Many modifications and variations of the present disclosure are possible in light of the above teachings. Therefore, the present disclosure may be practiced other than as specifically described.

The invention claimed is:

1. An adjusting device for a vehicle seat comprising:
a brake housing centered about an actuating rotational axis wherein the brake housing is formed in a radial direction of the actuating rotational axis by a housing element that includes a generally circular portion having an outer side wall, and upper wall and an inner side wall and a plurality of integrally formed fastening portions extending outwardly from the housing element outer side wall and spaced circumferentially around the housing element outer side wall;
a flange element positioned adjacent the housing element, wherein the flange element is directly connected to the housing element at each of the housing element listening portions, wherein an entire lower surface of the housing element directly abuts an upper surface of the flange element.

2. The adjusting device as set forth in claim 1, wherein the flange element is disposed in at least one axial direction of the actuating rotational axis.

3. The adjusting device as set forth in claim 1, wherein the flange element and the housing element are fixedly connected together by a fastener to form the brake housing.

4. The adjusting device as set forth in claim 1 wherein the housing element upper wall is parallel to a principal plane of extension of the housing element.

5. The adjusting device as set forth in claim 1, wherein the housing element inner side wall includes at least one functional surface which is inclined relative to the upper wall by an angle of inclination, and the functional surface receives a plurality of rolling elements.

6. The adjusting device as set forth in claim 5, wherein the angle of inclination is substantially a right angle.

7. The adjusting device as set forth in claim 5, wherein the at least one functional surface is precision-stamped.

8. A method for forming an adjusting device for a vehicle seat, said method including the steps of:
forming a housing element from a plate-shaped material, wherein the housing element is centered about an actuating rotational axis and is formed in a radial direction of the actuating rotational axis by a generally circular portion having an outer side wall, and upper wall and an inner side wall and a plurality of integrally formed fastening portions extending outwardly from the housing element outer side wall and spaced circumferentially around the housing element outer side wall, and the housing element inner side wall includes a functional surface that is precision-stamped; and
fixedly joining the housing element and a flange element, wherein the flange element is directly connected to the housing element by each of the housing element fastening portions, wherein an entire lower surface of the housing element directly abuts an upper surface of the flange element.

9. An adjusting device for a vehicle seat comprising:
a brake housing centered about an actuating rotational axis wherein the brake housing is formed in a radial direction of the actuating rotational axis by a housing element which is formed from a plate-shaped material, wherein a plurality of rolling elements are retained in the brake housing; and
a flange element disposed in at least one axial direction of the actuating rotational axis, wherein the flange element and the housing element are fixedly connected together to form the brake housing, wherein a housing element upper wall is parallel to a principal plane of extension of the housing element, and a housing element inner sidewall includes at least one functional surface which is inclined relative to the upper wall by an angle of inclination and the functional surface receives the rolling elements.

10. An adjusting device for a vehicle seat comprising:
a brake housing centered about an actuating rotational axis that extends in a radial direction of the actuating rotational axis and includes a housing element directly connected to a flange element, wherein the flange element is disposed at least one axial direction of the actuating rotational axis, and the housing element is generally circular with an outer side wall, an upper wall and an inner side wall, and a plurality of integrally formed fastening portions extending outwardly from the housing element outer side wall and spaced circumferentially around the housing element outer side wall, and the inner side wall includes at least one functional surface inclined relative to the upper wall by an angle of inclination and the functional surface receives a plurality of rolling elements that are contained by the connected housing element and flange, wherein an entire lower surface of the housing element directly abuts an upper surface of the flange element.

11. The adjusting device of claim 10 further comprising a drive gear disposed within the brake housing and centered on the actuating rotational axis and having a plurality of teeth, wherein the rolling elements are positioned between the drive gear teeth and housing element inner wall.

12. The adjusting device of claim 10 wherein the housing element upper wall is parallel to a principal plane of extension of the housing element.

13. The adjusting device of claim 10, wherein the angle of inclination is substantially a right angle.

14. An adjusting device for a vehicle seat comprising:
a brake housing centered about an actuating rotational axis wherein the brake housing is formed in a radial direction of the actuating rotational axis by a housing element that includes a generally circular portion having an outer side wall, and upper wall and an inner side wall and a plurality of integrally formed fastening portions extending outwardly from the housing element outer side wall and spaced circumferentially around the housing element outer side wall;
a flange element positioned adjacent the housing element and directly connected to the housing element at each of the housing element fastening portions and the flange element is disposed in at least one axial direction of the actuating rotational axis, wherein the housing element inner side wall includes at least one functional surface which is inclined relative to the upper wall by an angle of inclination, and the functional surface receives a plurality of rolling elements, and an entire lower surface of the housing element directly abuts an upper surface of the flange element.

15. The adjusting device as set forth in claim 14, wherein the at least one functional surface is precision-stamped.

16. The adjusting device as set forth in claim 14, wherein the angle of inclination is substantially a right angle.

* * * * *